United States Patent
Deng et al.

(10) Patent No.: US 12,025,291 B2
(45) Date of Patent: Jul. 2, 2024

(54) LIGHTING LAMP

(71) Applicants: SUZHOU OPPLE LIGHTING CO., LTD., Suzhou (CN); OPPLE LIGHTING CO., LTD., Shanghai (CN)

(72) Inventors: Shitao Deng, Suzhou (CN); Song Yin, Suzhou (CN); Shuangzeng Li, Suzhou (CN)

(73) Assignees: SUZHOU OPPLE LIGHTING CO., LTD., Suzhou (CN); OPPLE LIGHTING CO., LTD., Shanghai (CN)

( * ) Notice: Subject to any disclaimer, the term of this patent is extended or adjusted under 35 U.S.C. 154(b) by 0 days.

(21) Appl. No.: 18/083,438

(22) Filed: Dec. 16, 2022

(65) Prior Publication Data

US 2023/0118764 A1 Apr. 20, 2023

Related U.S. Application Data

(63) Continuation of application No. PCT/CN2021/102750, filed on Jun. 28, 2021.

(30) Foreign Application Priority Data

Jun. 29, 2020 (CN) .......................... 202010604481.2
Jun. 29, 2020 (CN) ........................ 202010605635.X
(Continued)

(51) Int. Cl.
*F21V 11/00* (2015.01)
*F21V 8/00* (2006.01)
(Continued)

(52) U.S. Cl.
CPC .............. *F21V 11/00* (2013.01); *F21V 11/06* (2013.01); *G02B 6/0073* (2013.01);
(Continued)

(58) Field of Classification Search
CPC .. G02B 6/0011; G02B 6/0068; G02B 6/0091; G02B 6/0041; G02B 6/0035;
(Continued)

(56) References Cited

U.S. PATENT DOCUMENTS 8,231,258 B2  7/2012 Kim et al.
8,382,354 B2  2/2013 Kim et al.
(Continued)

FOREIGN PATENT DOCUMENTS

CN  2583755 Y  10/2003
CN  102124384 A  * 7/2011  ............ B42D 25/29
(Continued)

OTHER PUBLICATIONS

International Search Report of PCT Application No. PCT/CN2021/102750 dated Sep. 29, 2021 with English translation, (6p).

*Primary Examiner* — Erin Kryukova
(74) *Attorney, Agent, or Firm* — Arch & Lake LLP

(57) ABSTRACT

The present disclosure discloses a lighting lamp, the lighting lamp includes a housing, a control system and a first light source module, the housing has a light exiting port, the first light source module includes a light guide plate and a first red green blue (RGB) light source, the control system controls the first RGB light source to emit first light of a first predetermined color, the light guide plate is installed on the light exiting port, the light guide plate includes a first plate surface facing outside of the housing, a second plate surface facing inside of the housing, and a outer peripheral surface connecting the first plate surface and the second plate surface, the first RGB light source faces the outer peripheral surface, wherein the first light enters the light guide plate through the outer peripheral surface, and exits the light guide plate through the first plate surface.

13 Claims, 8 Drawing Sheets

(30) Foreign Application Priority Data

Jun. 29, 2020 (CN) .......................... 202021226223.7
Jun. 29, 2020 (CN) .......................... 202021227218.8

(51) Int. Cl.
*F21V 11/06* (2006.01)
*F21Y 113/10* (2016.01)

(52) U.S. Cl.
CPC ......... *G02B 6/0076* (2013.01); *G02B 6/0088* (2013.01); *F21Y 2113/10* (2016.08)

(58) Field of Classification Search
CPC .... F21V 7/0008; F21V 7/0016; F21V 7/0091; F21V 5/04; F21S 6/008; F21Y 2113/13; G02F 1/133603

See application file for complete search history.

(56) References Cited

U.S. PATENT DOCUMENTS

| | | |
|---|---|---|
| 10,078,175 B2 | 9/2018 | Yamaguchi et al. |
| 10,359,161 B2 | 7/2019 | Yamauchi et al. |
| 2008/0157009 A1* | 7/2008 | Wittenberg ....... G02F 1/133615 250/494.1 |
| 2011/0205758 A1 | 8/2011 | Kim et al. |
| 2011/0242804 A1* | 10/2011 | Yang ...................... H05B 45/20 362/231 |
| 2012/0224392 A1 | 9/2012 | Kim et al. |
| 2012/0320626 A1* | 12/2012 | Quilici ................. G02B 6/0035 362/606 |
| 2014/0362566 A1* | 12/2014 | Tischler .................... F21V 7/00 362/230 |
| 2017/0097152 A1* | 4/2017 | Scribante ................. F21S 8/00 |
| 2017/0131459 A1 | 5/2017 | Yamaguchi et al. |
| 2018/0283627 A1 | 10/2018 | Yamauchi et al. |

FOREIGN PATENT DOCUMENTS

| | | | |
|---|---|---|---|
| CN | 204083912 U | 1/2015 | |
| CN | 105974722 A | 9/2016 | |
| CN | 106168358 A | 11/2016 | |
| CN | 108692250 A | 10/2018 | |
| CN | 105065952 B | 1/2019 | |
| CN | 110081378 A | 8/2019 | |
| CN | 110995898 A | 4/2020 | |
| CN | 111623301 A | 9/2020 | |
| CN | 111623302 A | 9/2020 | |
| CN | 212408338 U | 1/2021 | |
| CN | 212456675 U | 2/2021 | |
| DE | 202004018144 U1 | 3/2005 | |
| DE | 102012203791 A1 * | 9/2013 | ............ F21S 48/215 |
| WO | WO-2011124599 A1 * | 10/2011 | ............... F21K 9/00 |
| WO | WO-2018009826 A1 * | 1/2018 | .............. F21V 11/00 |
| WO | WO-2018185475 A1 * | 10/2018 | ......... G02B 19/0028 |

* cited by examiner

LIGHTING LAMP

CROSS-REFERENCE TO RELATED APPLICATIONS

This application is based upon and claims the priority of PCT patent application No. PCT/CN2021/102750 filed on Jun. 28, 2021 which claims priority to the Chinese patent application No. 202010605635.X filed on Jun. 29, 2020, Chinese patent application No. 202010604481.2 filed on Jun. 29, 2020, Chinese patent application No. 202021227218.8 filed on Jun. 29, 2020 and the Chinese patent application No. 202021226223.7 filed on Jun. 29, 2020, the entire contents of which are hereby incorporated by reference herein for all purposes.

TECHNICAL FIELD

The present disclosure relates to a field of lighting equipment, and in particular, to a lighting module and a lighting lamp.

BACKGROUND

Lamps are widely used in home lighting, commercial lighting, industrial lighting, landscape lighting, etc., providing convenience for people's lives. With the continuous improvement of user needs, the performance of lighting lamps is also constantly optimized.

SUMMARY

The present disclosure discloses a lighting lamp.
The present disclosure provides a lighting lamp. The lighting lamp may include a housing; a control system; and a first light source module.

The housing may include a light exiting port, the first light source module may include a light guide plate and a first red green and blue (RGB) light source, the control system may control the first RGB light source to emit first light of a first predetermined color, and the light guide plate may be installed on the light exiting port, the light guide plate may include a first plate surface facing outside of the housing, a second plate surface facing inside of the housing, and an outer peripheral surface connecting the first plate surface and the second plate surface, and the first RGB light source may face the outer peripheral surface, where the first light enters the light guide plate through the outer peripheral surface, and exits the light guide plate through the first plate surface.

It is to be understood that both the foregoing general description and the following detailed description are exemplary and explanatory only and are not restrictive of the present disclosure.

BRIEF DESCRIPTION OF THE DRAWINGS

The drawings illustrated here are used to provide a further understanding of the present disclosure and form a part of the present disclosure. The illustrative examples of the present disclosure and the descriptions thereof are used to explain the present disclosure, and do not constitute undue restrictions on the present disclosure. In the drawings.

DETAILED DESCRIPTION

Figure 1:
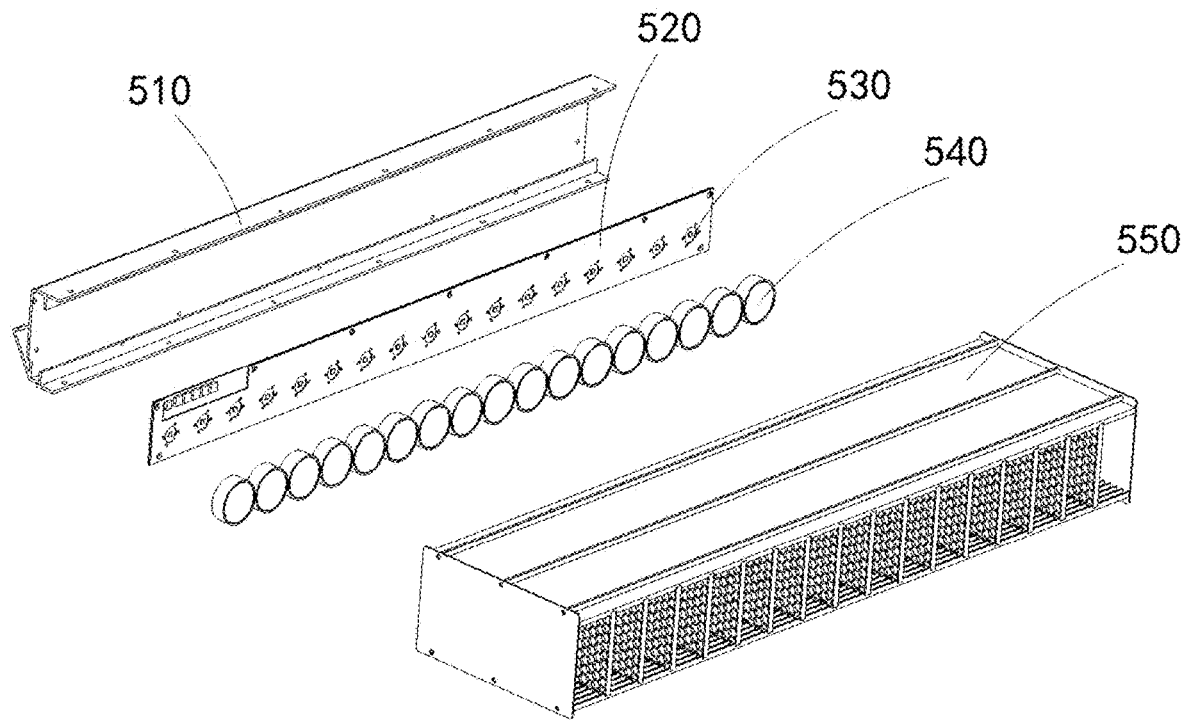
FIG. 1 is an exploded view of a lighting module according to an example of the present disclosure.
Figure 2:
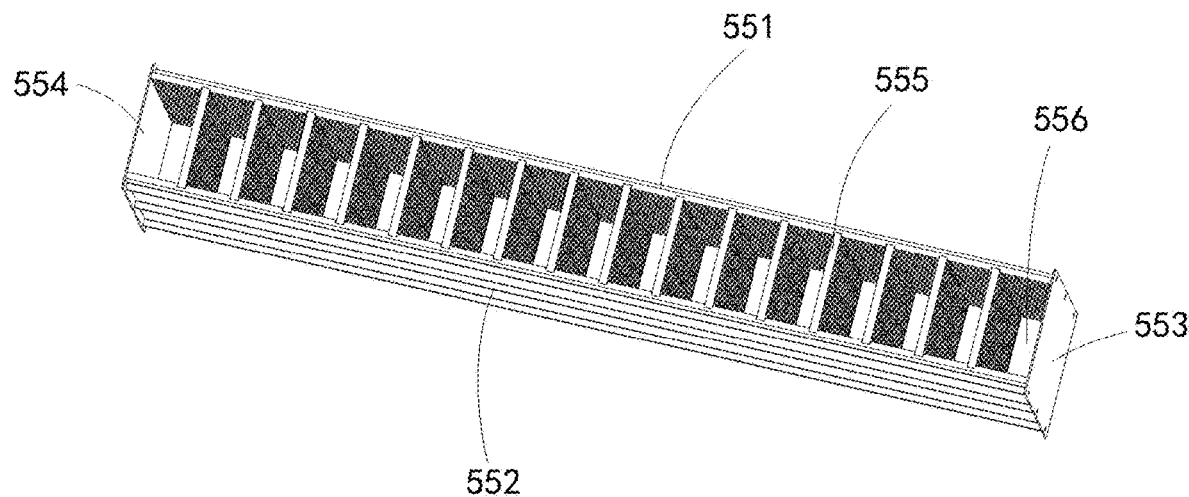
FIG. 2 is a schematic diagram of a light extinction grille of a lighting module shown in FIG. 1.
Figure 3:
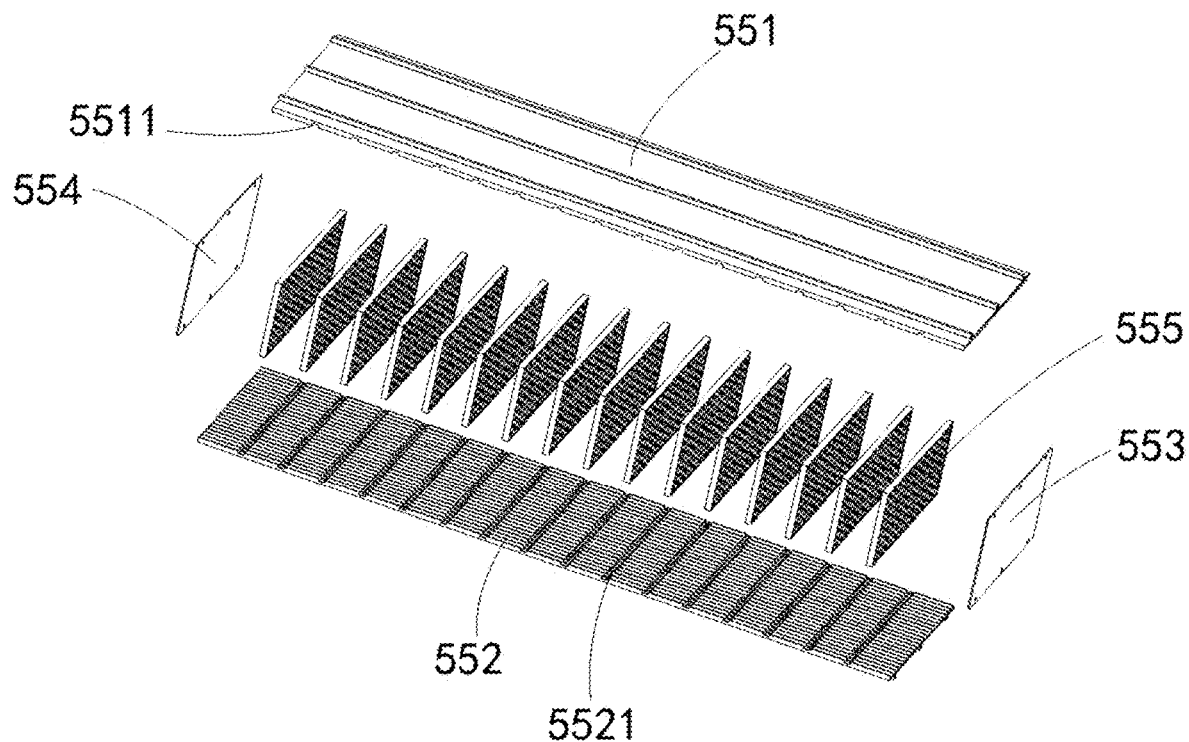
FIG. 3 is an exploded view of the light extinction grille shown in FIG. 2.
Figure 4:
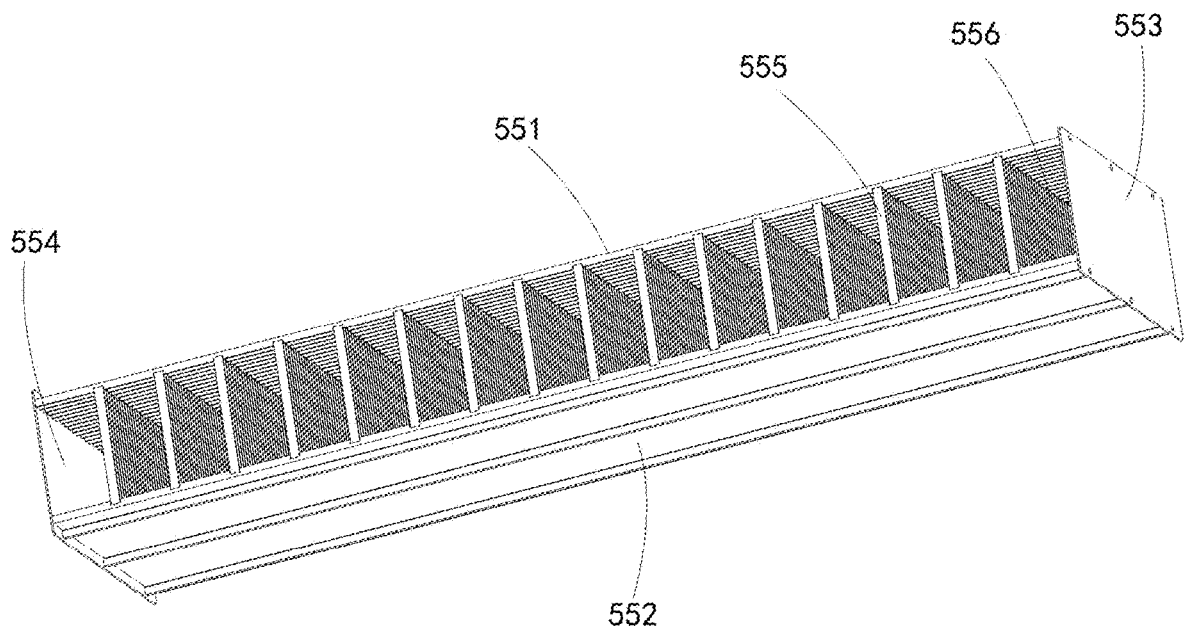
FIG. 4 is a schematic diagram of a light extinction grille of a lighting module according to another example of the present disclosure.

In order to make those skilled in the art better understand technical solutions in the present disclosure, the technical solutions in examples of the present disclosure will be clearly and completely described in combination with the accompanying drawings in the examples of the present disclosure. Apparently, the described examples are only a part of the examples of the present disclosure, but not all of the examples. All further examples obtained by those skilled in the art based on the examples of the present disclosure without creative efforts should fall into the scope of the present disclosure.

Reference numbers used in this disclosure may include: 100—housing, 110—top wall, 120—bottom wall, 121—lighting module shielding region, 130—peripheral wall, 140—light exiting port, 150—L-shaped connection part, 160—RGB light source module fixing member, 170—light exiting port frame, 200—RGB light source module, 210—first RGB light source, 211—first RGB LED, 220—second RGB light source, 230—light guide plate, 300—annular decorative cover, 400—lamp bearing rack, 500—lighting module, 510—fixing bracket, 520—light source circuit board, 530—LED, 540—lens, 541—first end, 542—second end, 543—reflective slope, 544—light source installation cavity, 550—light extinction grille, 551—top plate, 5511—first insertion groove, 552—bottom plate, 5521—second insertion groove, 553—first side plate, 554—second side plate, 555—grille plate, 556—light extinction cavity.

The light source may be a point light source, and the light emitted by the light source may be scattered towards various angles. In order to pursue higher optical efficiency and achieve precise light distribution, the light source may be used together with optical elements, such as the reflector and the lens. However, even after the light emitted by the light source is adjusted by optical elements, such as the reflector and the lens, there may still be a plurality of stray light, which may affect the lighting effect of the lamp and cause glare problems during use.

Therefore, it is desirable to have a lighting module that can overcome or at least alleviate the above-mentioned drawbacks.

In the description of the present disclosure, it should be noted that the term "spaced apart from each other" means that there is a gap between two components.

The technical solutions disclosed in examples of the present disclosure will be described in detail below with reference to the drawings.

Examples of the present disclosure disclose a lighting module, referring to FIG. 1 to FIG. 15, the lighting module includes a light source module and a light extinction grille 550.

The light extinction grille 550 has a light extinction cavity 556. In a length direction of the light extinction cavity 556, two ends of the light extinction cavity 556 are respectively an extinction cavity light entrance and an extinction cavity light exiting port, and the light source module is arranged at the extinction cavity light entrance. The light extinction cavity 556 can eliminate or reduce stray light in the light emitted by the light source module, thereby avoiding problems such as glare caused by more stray light in the lighting module, improving the effective utilization of light, and improving the lighting effect of the lighting module.

The specific structure of the light source module may be appropriately selected according to actual needs. Optionally, referring to FIG. 1 and FIG. 13, the light source module includes an LED 530 and a lens 540, and the lens 540 includes a first end 541 and a second end 542 oppositely arranged, and a reflective slope 543 connecting the first end 541 and the second end 542, the first end 541 is provided with a light source installation cavity 544, the LED 530 is installed in the light source installation cavity 544, an inner wall surface of the light source installation cavity 544 is a light incident surface, and an end surface of the second end 542 is a light exit surface, and the second end 542 is located at the extinction cavity light entrance. The scattered light emitted by the LED 530 enters the lens 540 through the light incident surface, part of the light is reflected by the reflective slope 543 and then exits through the light exit surface, and part of the light exits directly through the light exit surface, so that the light emitted by the LED 530 is converged and exited, thereby improving the luminous effect of the light source module, improving light utilization and reducing stray light.

Optionally, the length direction of the light extinction cavity 556 is perpendicular to an end face of the second end 542 (ie, the light exit surface), so that the third light emitted perpendicular to the light exit surface can be exited through the light extinction cavity 556 to improve light utilization.

The number and arrangement of the LEDs 530 and the lenses 540 may be appropriately selected according to usage requirements, and the number of the light extinction cavity 556 may also be appropriately selected according to the usage requirements. For example, the light extinction cavity 556 is formed into a single light extinction cavity 556 corresponding to a plurality of lenses 540. Optionally, the lighting module includes a fixing bracket 510, a plurality of LEDs 530 arranged in sequence in the length direction of the fixing bracket 510 and a plurality of lenses 540 arranged corresponding to the plurality of LEDs 530, the light extinction grille 550 is fixedly installed on the fixing bracket 510, in which the light extinction grille 550 has a plurality of light extinction cavities 556, and the plurality of light extinction cavities 556 are in one-to-one correspondence with the plurality of lenses 540, thereby further improving extinction effect of the light extinction grille 550 and reducing stray light of the lighting module 500. The fixing bracket 510 is fixedly installed on a housing 100, the plurality of LEDs 530 are installed at intervals on a light source circuit board 520, and the light source circuit board 520 is fixedly installed on the fixing bracket 510.

The specific structure of the light extinction grille 550 may be appropriately selected according to actual needs, as long as the stray light of the lighting module 500 can be effectively eliminated.

Referring to FIG. 5 to FIG. 15, the light extinction grille 550 includes a grille frame and a plurality of grille plates 555 installed on the grille frame, and the grille frame is fixedly installed on the fixing bracket 510, the grille frame includes a top plate 551, a bottom plate 552, a first side plate 553 and a second side plate 554, the top plate 551 and the bottom plate 552 are spaced apart from each other, in a length direction of the bottom plate 552, the first side plate 553 and the second side plate 554 are arranged at both ends of the bottom plate 552, and connect the top plate 551 and the bottom plate 552, the plurality of grille plates 555 are spaced apart from each other in the length direction of the bottom plate 552, and the grille plates 555 and the grille frame enclose to from the light extinction cavity 556. The light emitted by each LED 530 enters the light extinction cavity 556 after being refracted and/or reflected by corresponding lens 540, and then exits the light extinction cavity 556 after the stray light being eliminated by the light extinction cavity 556.

Figure 13:
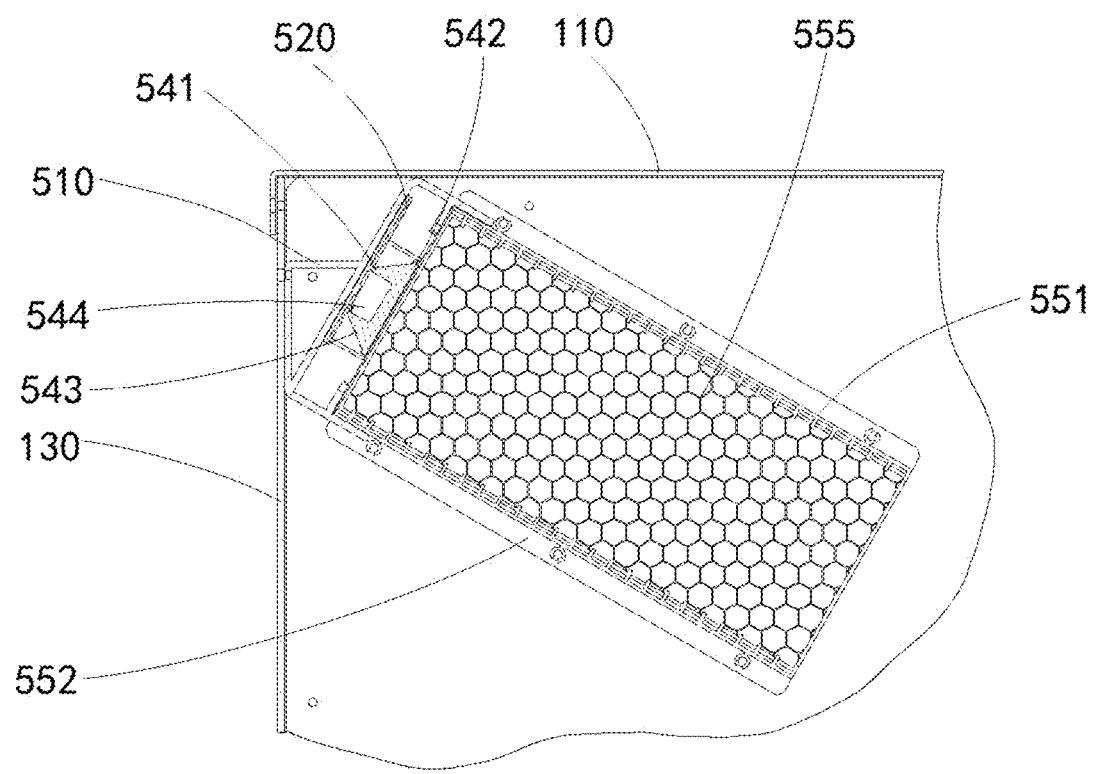
FIG. 13 is a partially enlarged schematic view of a position of the lighting module in the cross-sectional view of the lighting lamp shown in FIG. 12.
Figure 15:
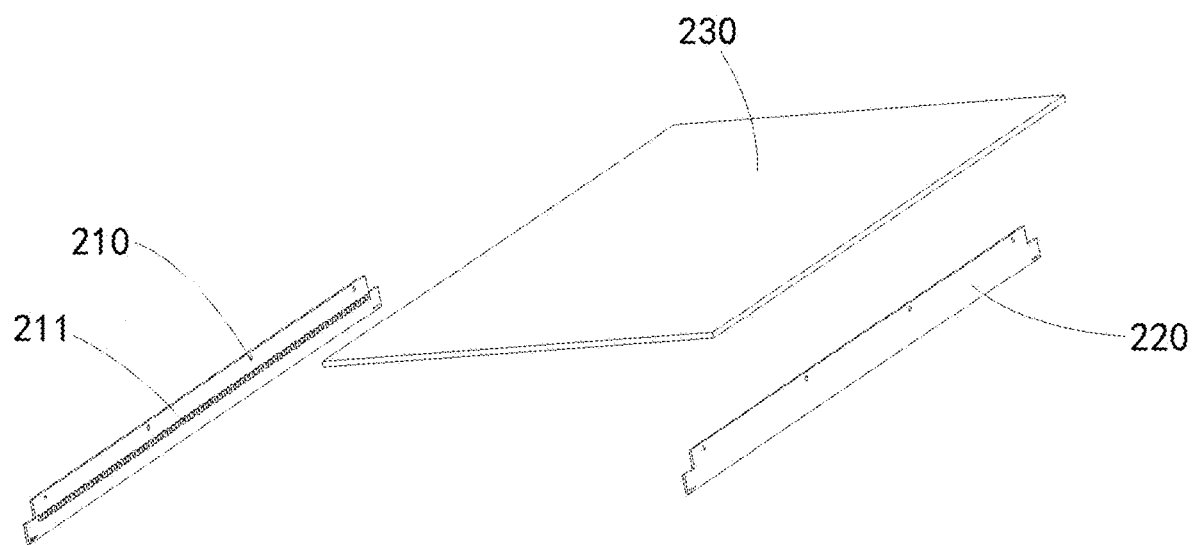
FIG. 15 is an exploded view of a red, green and blue (RGB) light source module of the lighting lamp shown in FIG. 8.

Referring to FIG. 13 and FIG. 15, the top plate 551 has a first insertion groove 5511 and/or the bottom plate 552 has a second insertion groove 5521, the grille plate 555 is inserted into the first insertion groove 5511 and/or the second insertion groove 5521 to facilitate a quick positioning and assembly of the grille plate 555 and improve the assembly efficiency of the light extinction grille 550. In some examples shown in figures, the top plate 551 has the first insertion groove 5511, the bottom plate 552 has the second insertion groove 5521, and the upper and lower ends of the grille plate 555 are respectively inserted into the first insertion groove 5511 and the second insertion groove 5521 to make the assembly of the grille plate 555 more stable and reliable.

In order to further improve the extinction effect of the light extinction grille 550, the grille plate 555 has an extinction structure. The specific structure of the extinction structure may be appropriately designed according to actual needs, for example, the extinction structure is a mesh extinction protrusion or a strip extinction protrusion. Referring to an example of the present disclosure shown in FIGS. 1 to 6, FIG. 12, and FIG. 13, the grille plate 555 is provided with mesh extinction protrusions. In the illustrated example, the grille plate 555 is integrally formed as a mesh plate, which can not only satisfy the extinction requirements but also reduce the weight of the grille plate, thereby reducing the weight of the lighting lamp. Referring to another example of the present disclosure shown in FIG. 4 to FIG. 6, the grille plate 555 is provided with strip extinction protrusions. In the illustrated example, the grille plate 555 includes a plate-shaped body and strip extinction protrusions on the plate-shaped body. In which, an extending direction of the strip extinction protrusion is preferably parallel to a second end surface of the lens 540 to better eliminate stray light.

In addition, in the case of need, at least one of the top plate 551, the bottom plate 552, the first side plate 553 and the second side plate 554 has the extinction structure to improve the extinction effect of the light extinction grille 550. The specific structure of the extinction structure may be appropriately designed according to actual needs, for example, the extinction structure is a mesh extinction protrusion or a strip extinction protrusion similar to the grille plate 555.

Figure 14:
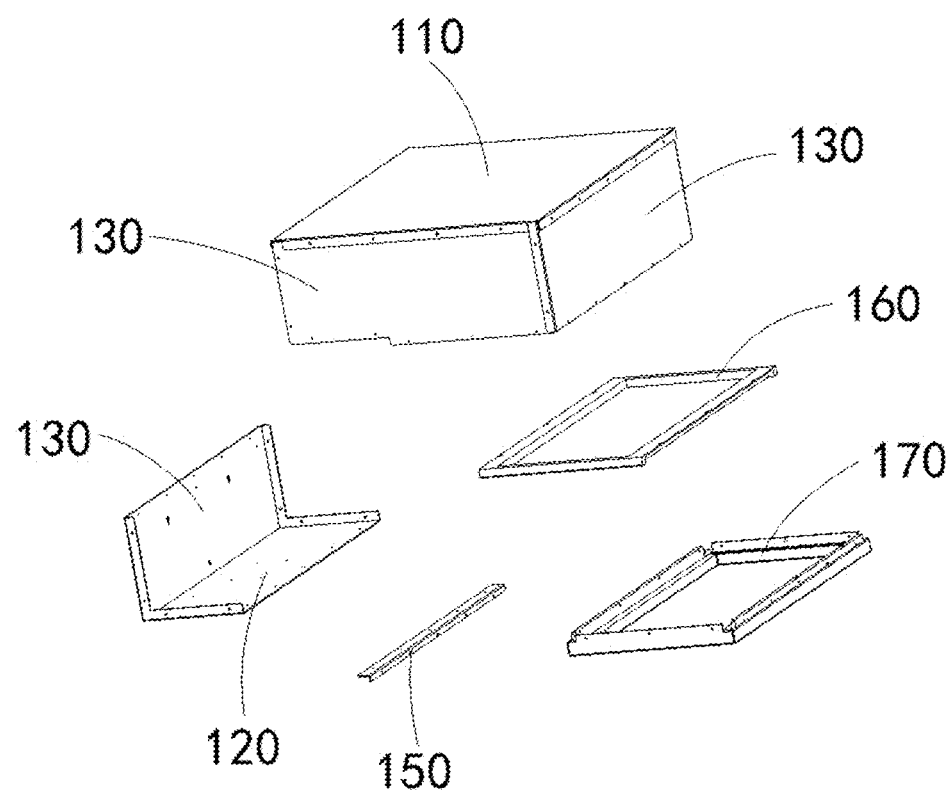
FIG. 14 is an exploded view of a housing of the lighting lamp shown in FIG. 8.

Referring to still another example of the present disclosure shown in FIG. 14 to FIG. 15, the light extinction grille 550 includes a grille frame and a plurality of grille plates 555 installed on the grille frame, and the grille frame is fixedly installed on the fixing bracket 510, the grille frame includes a top plate 551, a bottom plate 552, a first side plate 553 and a second side plate 554, the top plate 551 and the bottom plate 552 are spaced apart from each other, and in a length direction of the bottom plate 552, the first side plate 553 and the second side plate 554 are arranged at both ends of the bottom plate 552 and the first side plate 553, and connect the top plate 551 and the bottom plate 552, the plurality of grille plates 555 are spaced apart from each other in a width direction of the bottom plate 552, in which the light extinction cavity 556 penetrates the grille plates 555 in sequence in the width direction of the bottom plate 552. The grille plates 555 arranged at intervals are formed into a strip extinction structure on an inner circumference of the light extinction cavity 556. The entire inner circumference of the light extinction cavity 556 has the extinction structure, and there is no joint position, which improves the extinction effect of the light extinction grille 550.

The top plate 551 has a first insertion groove 5511 and/or the bottom plate 552 has a second insertion groove 5521, the grille plate 555 is inserted into the first insertion groove 5511 and/or the second insertion groove 5521 to facilitate a quick positioning and assembly of the grille plate 555 and improve the assembly efficiency of the light extinction grille 550. In the example shown in the figure, the top plate 551 has the first insertion groove 5511, the bottom plate 552 has the second insertion groove 5521, and the upper and lower ends of the grille plate 555 are respectively inserted into the first insertion groove 5511 and the second insertion groove 5521 to make the assembly of the grille plate 555 more stable and reliable.

Further, the light extinction grille 550 is coated with light extinction paint, and the light extinction paint can avoid or reduce reflection, thereby avoiding or reducing stray light generated by the reflection of the light extinction grille 550. The specific color and type of the light extinction paint may be appropriately selected according to actual needs. Optionally, the light extinction paint may be a frosted black paint with good extinction effect.

Examples of the present disclosure also disclose a lighting lamp, the lighting lamp includes a housing 100 and the lighting module 500 according to the above. The lighting module 500 is installed in the housing 100, and the housing 100 can protect the lighting module 500 and facilitate the installation and fixation of the lighting module 500.

Optionally, the lighting lamp further includes a control system and an RGB light source module 200. The housing 100 has a light exiting port 140, and the RGB light source module 200 includes a light guide plate 230 and a first RGB light source 210, the control system controls the first RGB light source 210 to emit first light of a first predetermined color. The first predetermined color may be appropriately selected according to different use requirements, such as blue sky color to simulate clear noon sky, reddish color to simulate evening or morning sky, blue-gray to simulate rainy weather, etc., so that people can obtain lighting effect close to natural light.

The light guide plate 230 is installed on the light exiting port 140, the light guide plate 230 includes a first plate surface facing outside of the housing 100, a second plate surface facing inside of the housing 100, and an outer peripheral surface connecting the first plate surface and the second plate surface, the first RGB light source 210 faces the outer peripheral surface, in which the first light enters the light guide plate 230 through the outer peripheral surface, and exits the light guide plate 230 through the first plate surface. After being transformed by the light guide plate, the first light is uniformly exited from the first plate surface of the light guide plate to form a surface light source to simulate a real sky.

The specific type of the light guide plate 230 may be appropriately selected, for example, an acrylic light guide plate, but traditional acrylic light guide plate needs to be printed with light guide points on the light guide plate through laser engraving and cross-grid engraving lamp technology, causing the user to see grid light patterns on the light guide plate, which is quite different from the real sky and then affects the lighting effect of the lamp. Optionally, the light guide plate 230 is a nano light guide plate, and the nano light guide plate utilizes light scattering effect of nanoparticles evenly dispersed in the light guide plate 230 to convert a line light source or a point light source into a surface light source, and the surface of the light guide plate 230 does not need to be designed and processed with any dot and grid, which making the lighting effect of lighting lamp more uniform and soft, and closer to the real sky.

In the case where the size of the light guide plate 230 is relatively large, it is difficult for the first RGB light source 210 to meet the usage requirements. Therefore, referring to FIG. 5, in the example of the present disclosure, the RGB light source module 200 includes a second RGB light source 220, the control system controls the second RGB light source 220 to emit second light of a second predetermined color, and the second RGB light source 220 faces the outer peripheral surface, the second light enters the light guide plate 230 through the outer peripheral surface, and exits the light guide plate 230 through the first plate surface. The first RGB light source 210 and the second RGB light source 220 are used together to make the lighting effect better. In which, the second predetermined color may be appropriately selected according to different usage requirements, such as blue sky color to simulate clear noon sky, reddish color to simulate evening or morning sky, blue-gray to simulate rainy weather, etc., so that people can obtain lighting effect close to natural light. In which, the first predetermined color and the second predetermined color may be the same or different according to the actual required lighting effect.

Further, the light guide plate 230 is a rectangular light guide plate, and in a width direction of the light guide plate 230, the first RGB light source 210 and the second RGB light source 220 are disposed on opposite sides of the light guide plate 230. The first RGB light source 210 and the second RGB light source 220 opposite to each other make the light distribution on the light guide plate 230 more uniform, so that the lighting effect of the lighting lamp is closer to the real sky.

Optionally, in a length direction of the light guide plate 230, the first RGB light source 210 extends from one end of the light guide plate 230 to the other end of the light guide plate 230, and the second RGB light source 220 extends from one end of the light guide plate 230 to the other end of the light guide plate 230, to make the light distribution on the entire light guide plate 230 uniform and beautiful. The specific types of the first RGB light source 210 and the second RGB light source 220 may be appropriately selected according to actual needs. Preferably, the first RGB light source 210 includes a plurality of first RGB LEDs 211 arranged in sequence, and the second RGB light source 220 includes a plurality of second RGB LEDs arranged in sequence. LED light source has the advantages of high luminous efficiency, long service life and environmental protection.

Referring to FIG. 1 to FIG. 5, in the example of the present disclosure, the light exiting port 140 is provided with a lamp bearing rack 400, and the lamp bearing rack 400 may be installed at a ceiling lamp position of the house, which is convenient for the installation and use of the lighting lamp. After installing the lighting lamp, only the position of the light exiting port can be observed by the user, and the housing 100 is completely hidden inside the structure such as a ceiling, which makes the lighting lamp more beautiful, and the light exiting port is similar to a window in a house, so that the lighting effect produced by the lighting lamp is closer to the real sky. In addition, the light exiting port 140 is provided with an annular decorative cover 300 arranged around the light exiting port, and the annular decorative cover 300 makes the part of the lighting lamp that can be observed by the user more beautiful.

Figure 7:
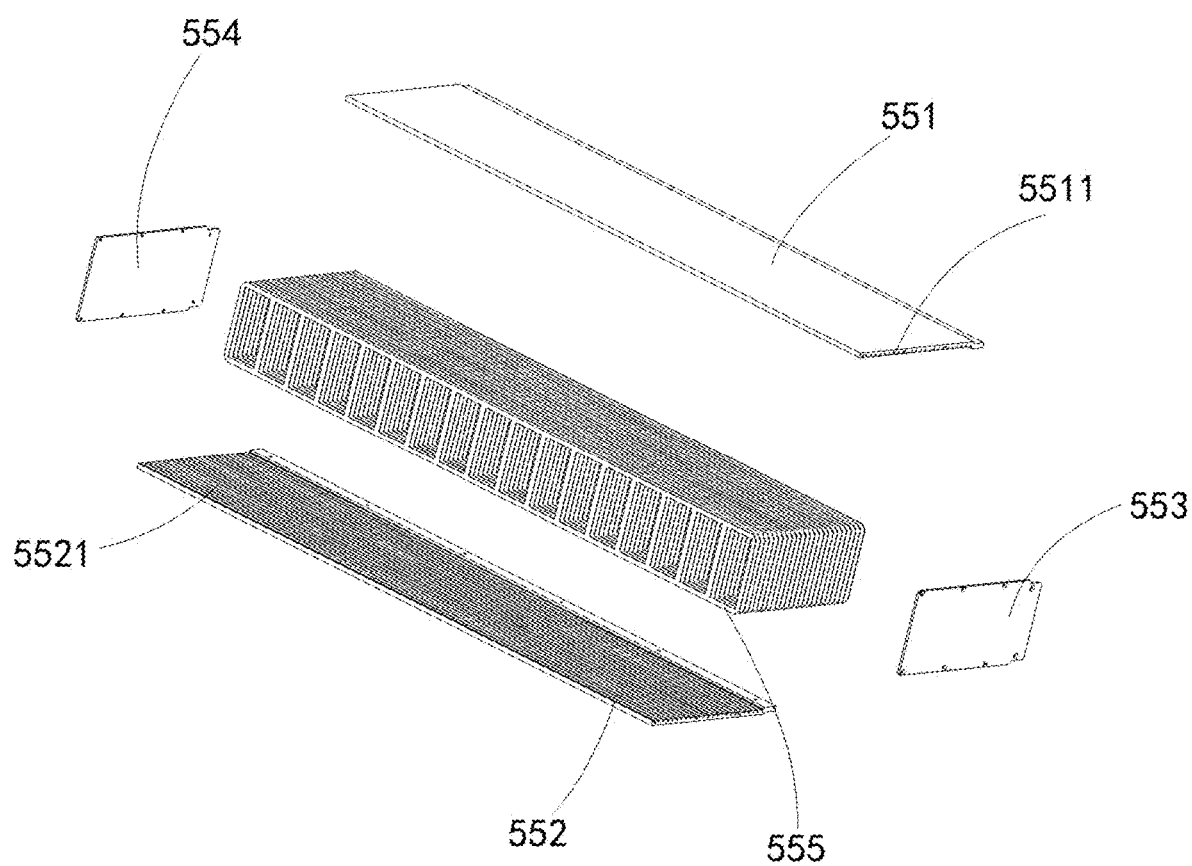
FIG. 7 is an exploded view of the light extinction grille shown in FIG. 6.
Figure 8:
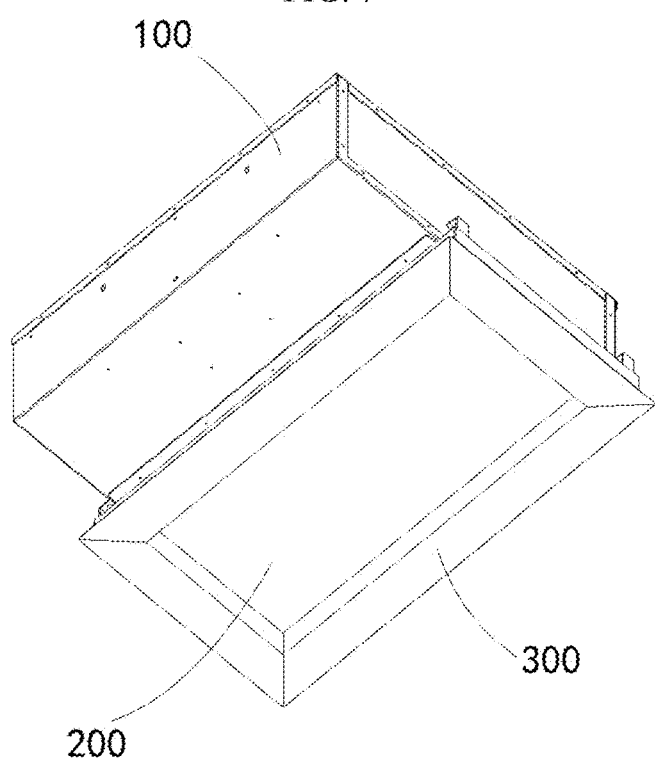
FIG. 8 and FIG. 9 are schematic diagrams of a lighting lamp disclosed in examples of the present disclosure.
Figure 9:
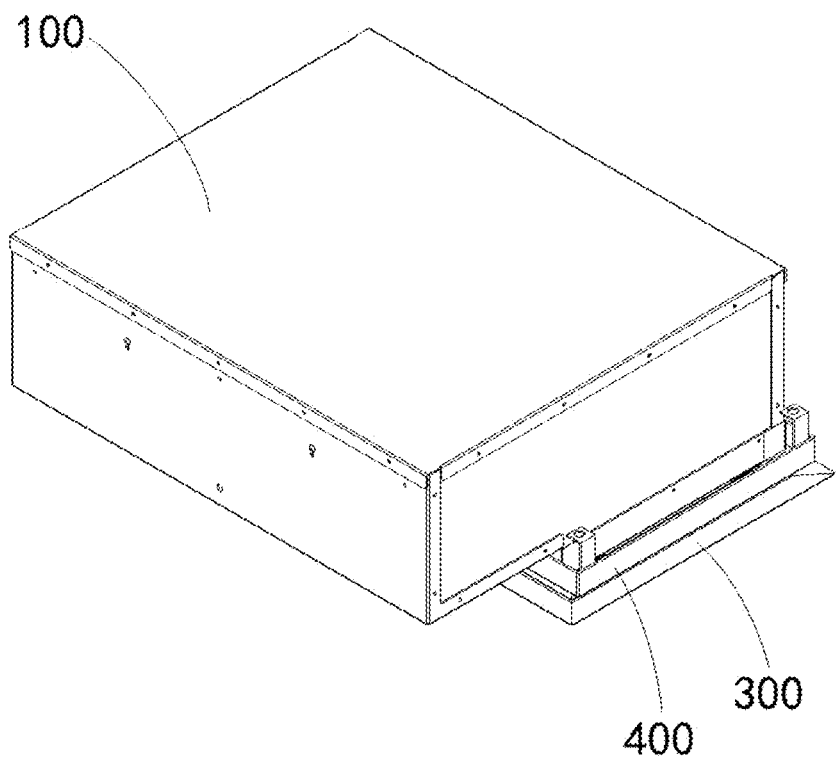
Figure 10:
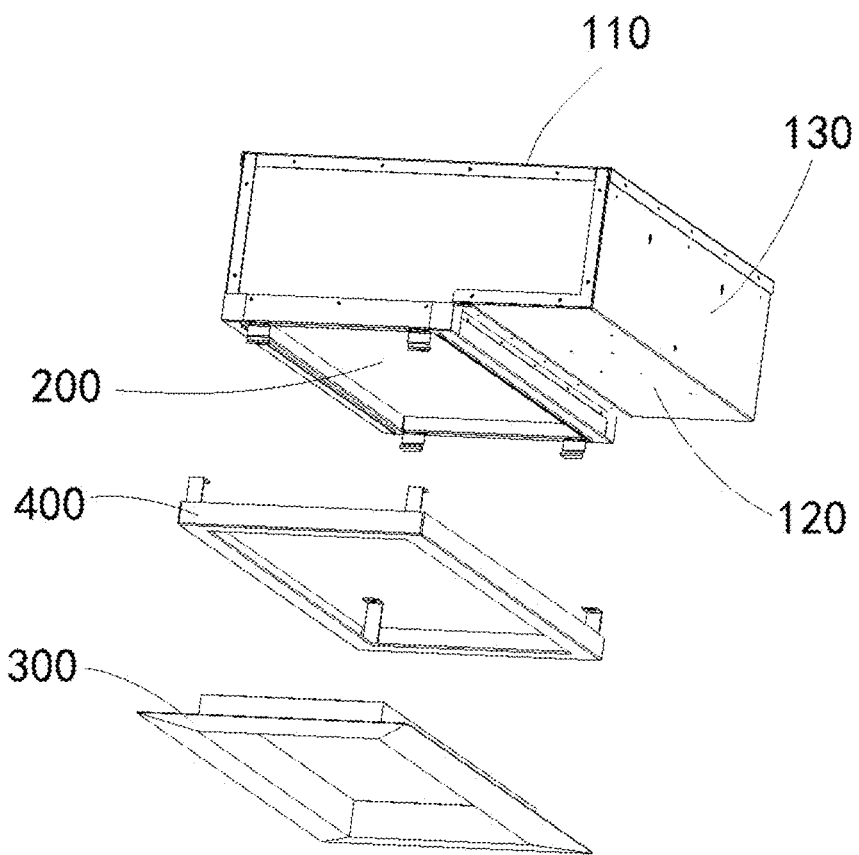
FIG. 10 is an exploded view of the lighting lamp shown in FIG. 8.
Figure 11:
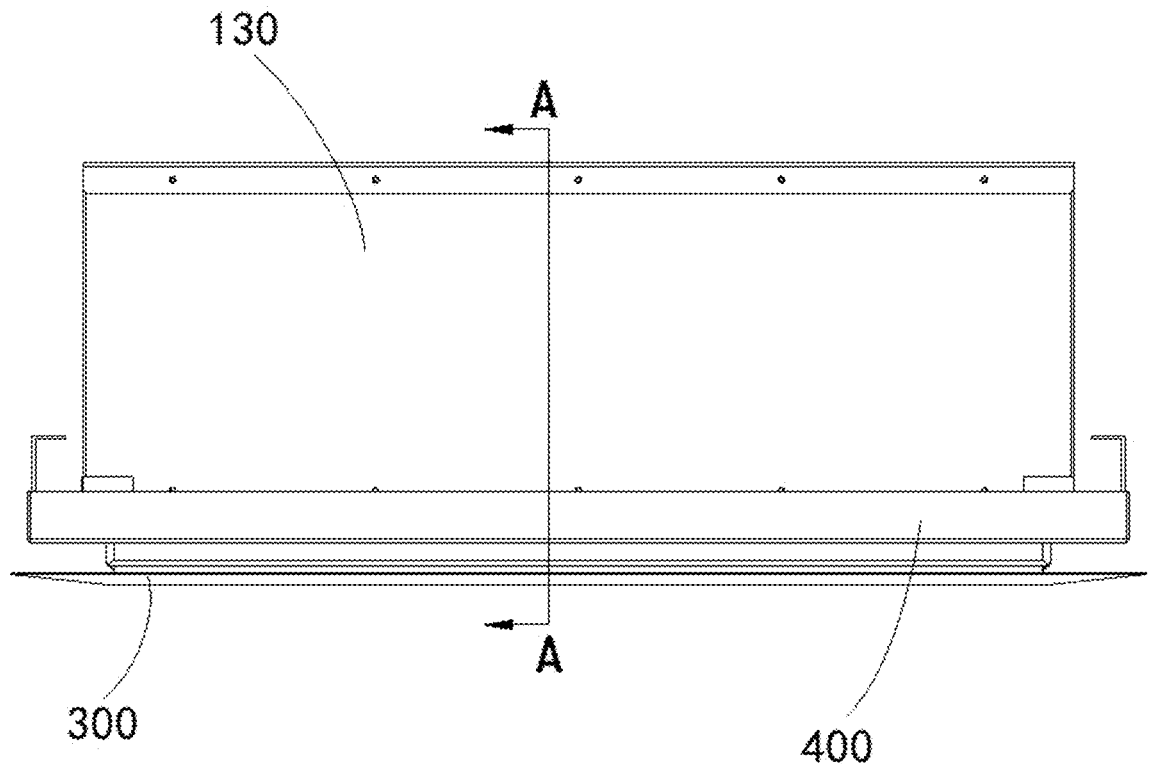
FIG. 11 is a side view of the lighting lamp shown in FIG. 8.
Figure 12:
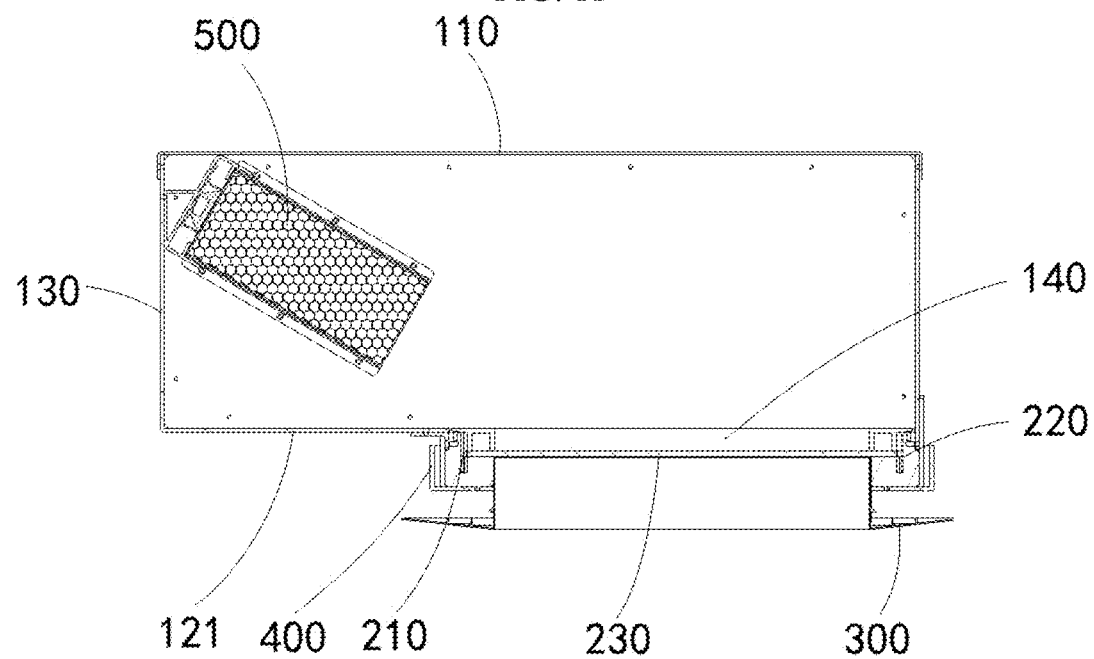
FIG. 12 is a cross-sectional view of the lighting lamp shown in FIG. 11 along a section line A-A, the lighting lamp is provided with the lighting module disclosed in examples of the present disclosure.

Referring to FIG. 7 the housing 100 includes an RGB light source module fixing member 160 and a light exiting port frame 170, the light exiting port frame 170 and the RGB light source module fixing member 160 are disposed at the light exiting port 140, and the light exiting port frame 170 is fixedly installed on the housing 100 by welding, riveting or screwing, the RGB light source module fixing member 160 is fixedly installed on the light exiting port frame 170, the RGB light source module 200 is installed on the RGB light source module fixing member 160, the light exiting port frame 170 and the RGB light source module fixing member 160 can improve the strength of the light exiting port 140 position of the housing 100 and facilitate the fixed installation of the RGB light source module 200. In the illustrated example of the present disclosure, the light exiting port frame 170 is fixed to the bottom wall 120 through the L-shaped connection part 150.

In the real sky, the position of the sun or the moon is brighter than other parts. In order to make the lighting effect of the lighting lamp closer to the real sky, optionally, the lighting module 500 emits third light, and the third light enters the light guide plate 230 through the second plate surface, and exits the light guide plate 230 through the first plate surface. The position where the light guide plate 230 is aligned with the lighting module 500 is brighter, which brings a user experience similar to the sun. Optionally, the color temperature of the third light is in a range from 2000 k to 7000 k, and the specific color temperature of the third light may be appropriately selected according to usage requirements, and different color temperatures may be selected upon simulating the sun at different times and different weather conditions. Further, the color temperature of the third light is in a range from 5700 k to 6500 k, which simulates sunlight on a clear day.

The light-emitting angle of the lighting module 500 may be appropriately selected according to the usage requirements. The stray light affects the lighting effect of the lighting lamp, and the light emitted by the lighting lamp is likely to be dazzling. Preferably, the light-emitting angle of the lighting module 500 is in a range from 0 degrees to 10 degrees.

Except for the equatorial region, the sunlight in most regions is irradiated obliquely. Therefore, the angle between the length direction of the light extinction cavity 556 and the second plate surface of the light guide plate 230 is preferably in a range from 20 degrees to 60 degrees. The third light emitted by the lighting module 500 obliquely enters the light guide plate 230, making the lighting effect of the lighting lamp closer to the real sky.

Optionally, the housing 100 includes a top wall 110 and a bottom wall 120, and a peripheral wall 130 connecting the top wall 110 and the bottom wall 120, the light exiting port 140 is disposed on the bottom wall 120, an inner surface of the top wall 110, an inner surface of the bottom wall 120 and an inner surface of the peripheral wall 130 are all coated with light extinction paint, the light extinction paint can avoid or reduce the stray light generated by the reflection of the light emitted by the RGB light source module 200 and the lighting module 500 in the housing 100, so as to improve the lighting effect of the lamp, and coating the light extinction paint, especially dark light extinction paint, on the inner side of the housing 100 can also make the "sky" simulated by the light guide plate 230 have a deep feeling, which is closer to the real sky effect. The specific color and type of the light extinction paint may be appropriately selected according to actual needs. Optionally, the light extinction paint may be a frosted black paint with good extinction effect, so as to make the "sky" simulated by the light guide plate 230 deeper.

Optionally, the bottom wall 120 includes a light exiting region and a lighting module shielding region 121, the light exiting port 140 is arranged in the light exiting region, the lighting module 500 is arranged corresponding to the lighting module shielding region 121, and the lighting module 500 deviates from the light exiting port 140, so that the lighting module 500 is blocked by the lighting module shielding region 121 to prevent the lighting module 500 from being exposed to the light exiting port 140, and the lighting lamp can provide the user with a more realistic lighting effect of the natural sky. In which, in a length direction of the light guide plate 230, the ratio of the size of the light guide plate 230 to the overall size of the lighting module is greater than 0.5, and in a thickness direction of the light guide plate 230, the ratio of the size of the lighting module 500 to the overall size of the lighting module is from 0.5 to 0.8, so that the structure of the lighting lamp is compact, and the arrangement space required for the lighting lamp is reduced under the condition that the size of the light exiting port 140 is the same.

Figure 5:
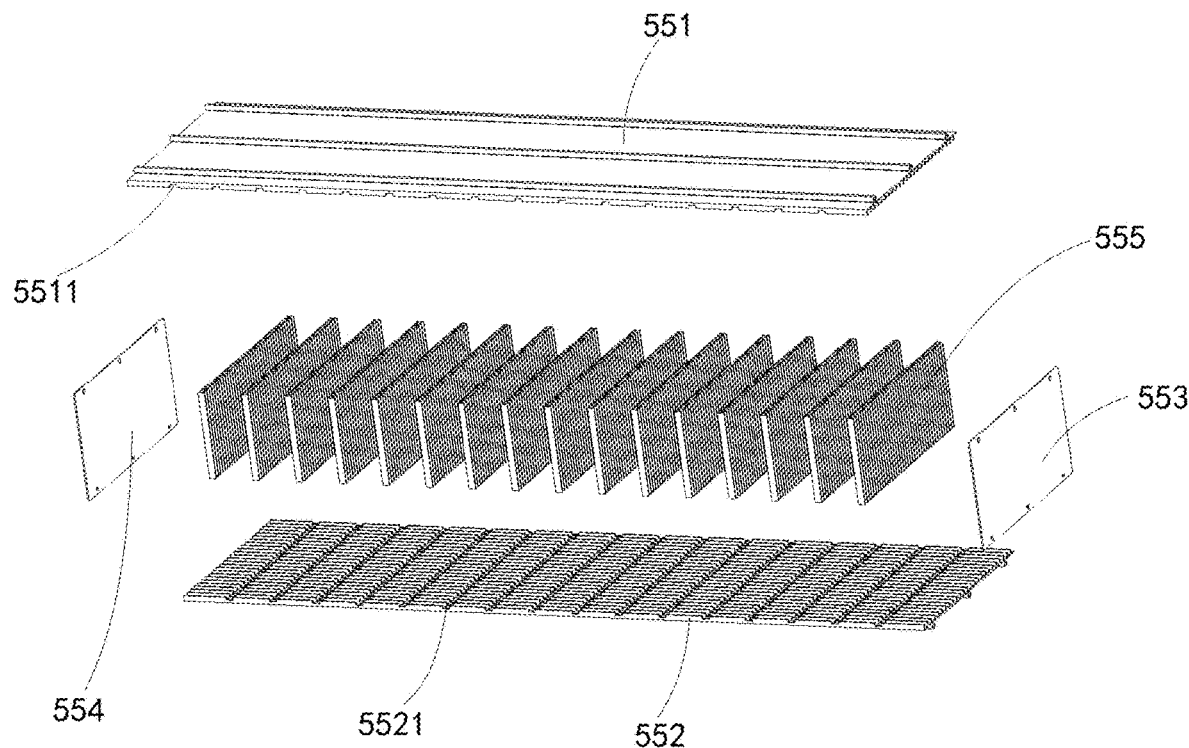
FIG. 5 is an exploded view of the light extinction grille shown in FIG. 4.
Figure 6:
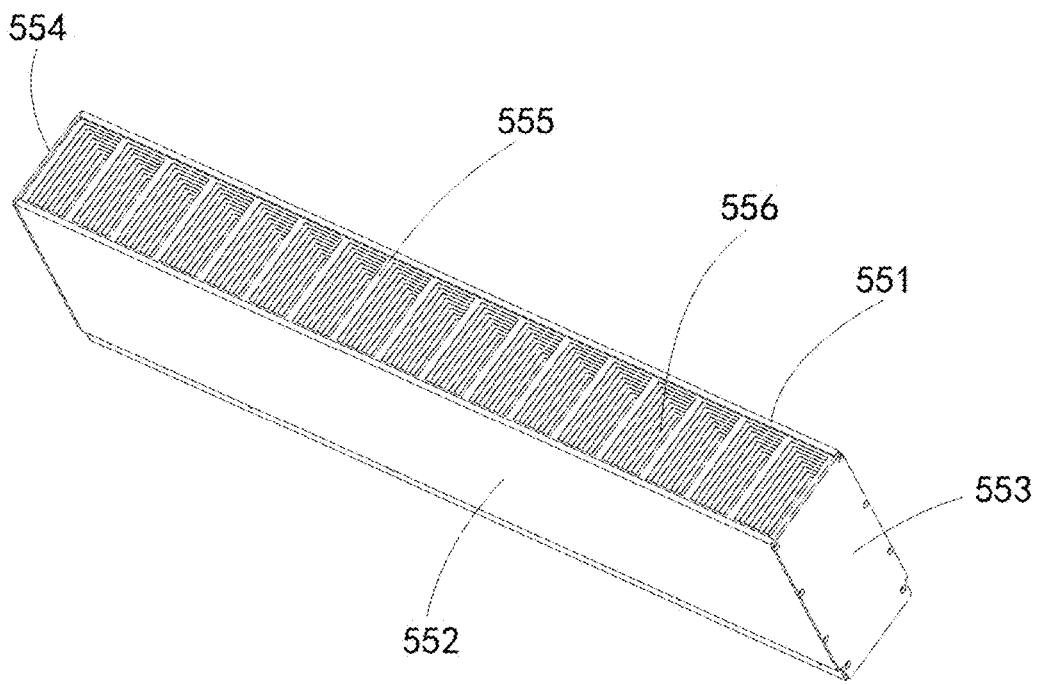
FIG. 6 is a schematic diagram of a light extinction grille of a lighting module according to still another example of the present disclosure.

The incident position of the third light emitted by the lighting module 500 on the light guide plate 230 may be appropriately selected according to the actual required lighting effect. Referring to FIG. 5, in the example of the present disclosure, the lighting module 500 faces the light guide plate 230 near the edge of the lighting module 500, the light guide plate 230 simulates a window in a house, and the sunlight simulated by the lighting module 500 is incident obliquely from the edge of the window, which makes the lighting effect of the lighting lamp softer and brings comfort to the user.

The present disclosure discloses a lighting module to solve the problem of more stray light in lighting lamp.

In order to solve the above-mentioned problems, the disclosure adopts the following technical solutions:

A lighting module includes a light source module and a light extinction grille, the light extinction grille has a light extinction cavity, and in a length direction of the light extinction cavity, two ends of the light extinction cavity are respectively an extinction cavity light entrance and an extinction cavity light exiting port, and the light source module is disposed at the extinction cavity light entrance.

A lighting lamp includes a housing and the lighting module according to the above, the lighting module is installed in the housing.

The technical solution adopted in this disclosure can achieve the following beneficial effects:

In the lighting module disclosed in the present disclosure, the light extinction grille is provided, and the light extinction grille has the light extinction cavity. The light emitted by the light source module enters the light extinction cavity, so that the unwanted stray light is absorbed and weakened by an inner wall of the light extinction cavity, so as to achieve the purpose of reducing the stray light of the lighting module, effectively improve the lighting effect of the lighting module, and avoid the glare problem during use.

The present disclosure may include dedicated hardware implementations such as disclosure specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an disclosure-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

The above-mentioned examples of the present disclosure focus on the differences between the respective examples, and as long as the different optimization features between the respective examples are not contradictory, they can be combined to form another example. Considering the succinct writing, the details will not be repeated herein.

The above descriptions are only the examples of the present disclosure, and are not used to limit the present disclosure. For those skilled in the art, the present disclosure can have various modifications and changes. Any modification, equivalent replacement, improvement, etc. made within the spirit and principle of the present disclosure will be included in the scope of the present disclosure.

What is claimed is:

1. A lighting lamp, comprising:
a housing;
a first light source module, wherein:
the housing comprises a light exiting port, the first light source module comprises a light guide plate and a first red green and blue (RGB) light source, and the light guide plate is installed on the light exiting port, the light guide plate comprises a first plate surface facing outside of the housing, a second plate surface facing inside of the housing, and an outer peripheral surface connecting the first plate surface and the second plate surface, and the first RGB light source faces the outer peripheral surface, wherein the first light enters the light guide plate through the outer peripheral surface, and exits the light guide plate through the first plate surface; and
a second light source module, wherein the second light source module is installed in the housing, and the second light source module comprises a fixing bracket, a plurality of LEDs arranged in sequence in a length direction of the fixing bracket, a plurality of lenses arranged corresponding to the plurality of LEDs, and a light extinction grille fixedly installed on the fixing bracket, wherein the light extinction grille has a plurality of light extinction cavities, and the plurality of light extinction cavities are in one-to-one correspondence with the plurality of lenses.

2. The lighting lamp according to claim 1, wherein the light guide plate is a nano light guide plate.

3. The lighting lamp according to claim 2, wherein the first light source module further comprises a second RGB light source, the second RGB light source faces the outer peripheral surface, the second light enters the light guide plate through the outer peripheral surface, and exits the light guide plate through the first plate surface.

4. The lighting lamp according to claim 3, wherein the light guide plate is a rectangular light guide plate, and in a width direction of the light guide plate, the first RGB light source and the second RGB light source are disposed on opposite sides of the light guide plate.

5. The lighting lamp according to claim 4, wherein, in a length direction of the light guide plate, the first RGB light source extends from one end of the light guide plate to the other end of the light guide plate, the first RGB light source comprises a plurality of first RGB LEDs arranged in sequence, and
in the length direction of the light guide plate, the second RGB light source extends from one end of the light guide plate to the other end of the light guide plate, the second RGB light source comprises a plurality of second RGB LEDs arranged in sequence.

6. The lighting lamp according to claim 1, wherein:
the light exiting port is provided with a lamp bearing rack; and/or
the light exiting port is provided with an annular decorative cover surrounding the light exiting port.

7. The lighting lamp according to claim 1, wherein the second light source module emits third light, the third light enters the light guide plate through the second plate surface, and exits the light guide plate through the first plate surface.

8. The lighting lamp according to claim 7, wherein:
a color temperature of the third light is in a range from 2000 k to 7000 k.

9. The lighting lamp according to claim 1, wherein in a length direction of each of the light extinction cavities, two ends of the each of the light extinction cavities are respectively an extinction cavity light entrance and an extinction cavity light exiting port, and the second end is arranged at the extinction cavity light entrance.

10. The lighting lamp according to claim 1, wherein the light extinction grille comprises a grille frame and a plurality of grille plates installed on the grille frame, and the grille frame is fixedly installed on the fixing bracket, the grille frame comprises a top plate, a bottom plate, a first side plate and a second side plate, the top plate and the bottom plate are spaced apart from each other, in a length direction of the bottom plate, the first side plate and the second side plate are arranged at both ends of the bottom plate, and connect the top plate and the bottom plate, the plurality of grille plates are spaced apart from each other in the length direction of the bottom plate, and the grille plates and the grille frame enclose to form the light extinction cavity.

11. The lighting lamp according to claim 1, wherein the light extinction grille comprises a grille frame and a plurality of grille plates installed on the grille frame, and the grille frame is fixedly installed on the fixing bracket, the grille frame comprises a top plate, a bottom plate, a first side plate and a second side plate, the top plate and the bottom plate are spaced apart from each other, and in a length direction of the bottom plate, the first side plate and the second side plate are arranged at both ends of the bottom plate, and connect the top plate and the bottom plate, the plurality of grille plates are spaced apart from each other in a width direction of the bottom plate, wherein the light extinction cavity penetrates the grille plates in sequence in the width direction of the bottom plate.

12. The lighting lamp according to claim 1, wherein the housing comprises a top wall and a bottom wall and a peripheral wall connecting the top wall and the bottom wall, the light exiting port is disposed on the bottom wall, an inner surface of the top wall, an inner surface of the bottom wall and an inner surface of the peripheral wall are all coated with light extinction paint.

13. The lighting lamp according to claim 12, wherein the bottom wall comprises a light exiting region and a second light source module shielding region, and the light exiting port is disposed in the light exiting region, the second light source module is disposed corresponding to the second light source module shielding region, and the second light source module deviates from the light exiting port.

* * * * *